United States Patent [19]

McCormick-Goodhart

[11] 4,402,597
[45] Sep. 6, 1983

[54] FILMSTRIP FOR PREVENTING FOGGING OF INTERMEDIATE FILM IN MICROFICHE RECORDING SYSTEMS

[75] Inventor: Mark H. McCormick-Goodhart, Grosse Pointe Woods, Mich.

[73] Assignee: Energy Conversion Devices, Inc., Troy, Mich.

[21] Appl. No.: 290,619

[22] Filed: Aug. 6, 1981

[51] Int. Cl.³ .................... G03B 27/32; G03B 27/52
[52] U.S. Cl. .................................. 355/64; 352/233; 355/133; 430/496; 430/501
[58] Field of Search ................... 352/82, 56, 233; 355/53, 54, 87, 91, 133, 64; 354/174, 275, 277, 354; 430/496, 501

[56] References Cited

U.S. PATENT DOCUMENTS 3,411,909 11/1968 Kern et al. ........................ 352/56
3,694,083 9/1972 White et al. .................... 355/91 X
4,235,533 11/1980 Norris ............................. 352/82 X Primary Examiner—Richard A. Wintercorn
Attorney, Agent, or Firm—Lawrence G. Norris

[57] ABSTRACT

An improved photographic filmstrip having localized transmission barriers for inhibiting propagation of light into still unimaged transparent portions of microfiche recording system intermediate filmstrips by light-piping action is described. The barriers serve to optically isolate the subsequently-to-be-imaged still unexposed portion of the filmstrip in a dispensing film head from the illumination used to transfer the previously developed image on the exposed portion of the strip onto a permanent recording medium, such as a microfiche film card. The barriers consist of arrays of holes spanning the width of the filmstrip. Multiple scattering and direct escape paths produced by the holes cause significant reduction in the undesired propagation. Additional propagation reduction is achieved by a fiber bearing element pressed over the hole arrays so as to insert fiber clusters into the holes. Use of the arrays for sprocket engagement to facilitate film transport is described.

18 Claims, 17 Drawing Figures

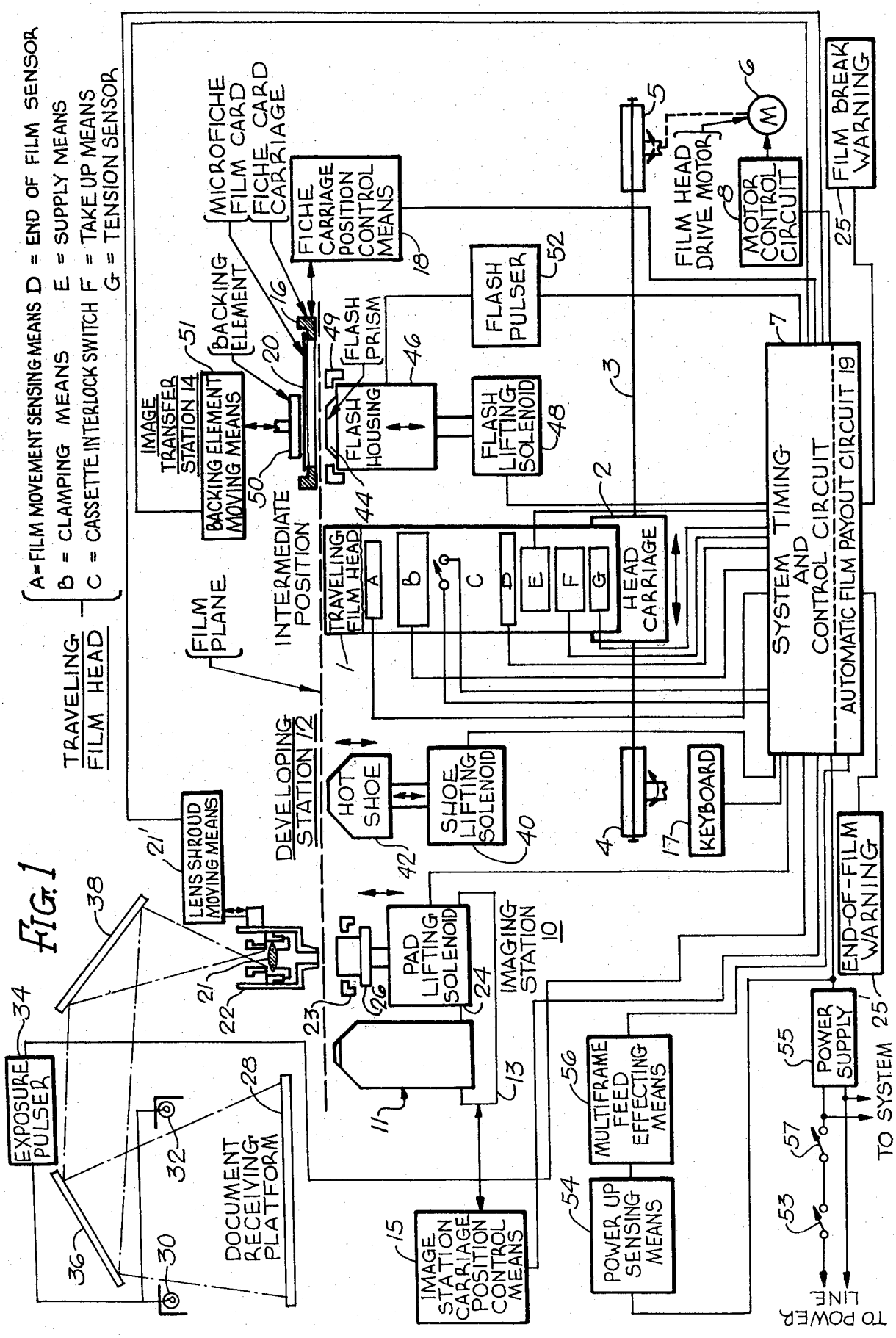

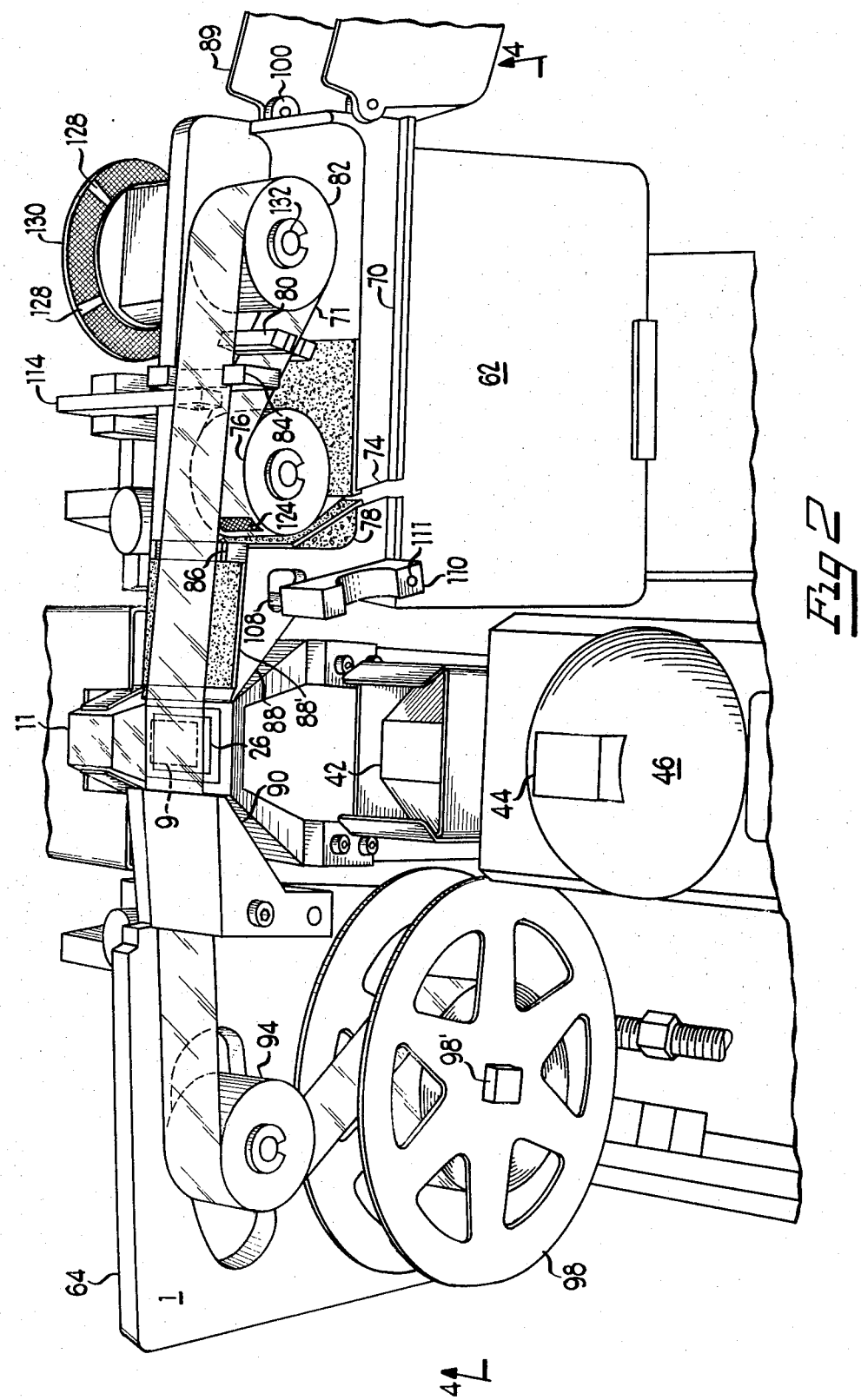

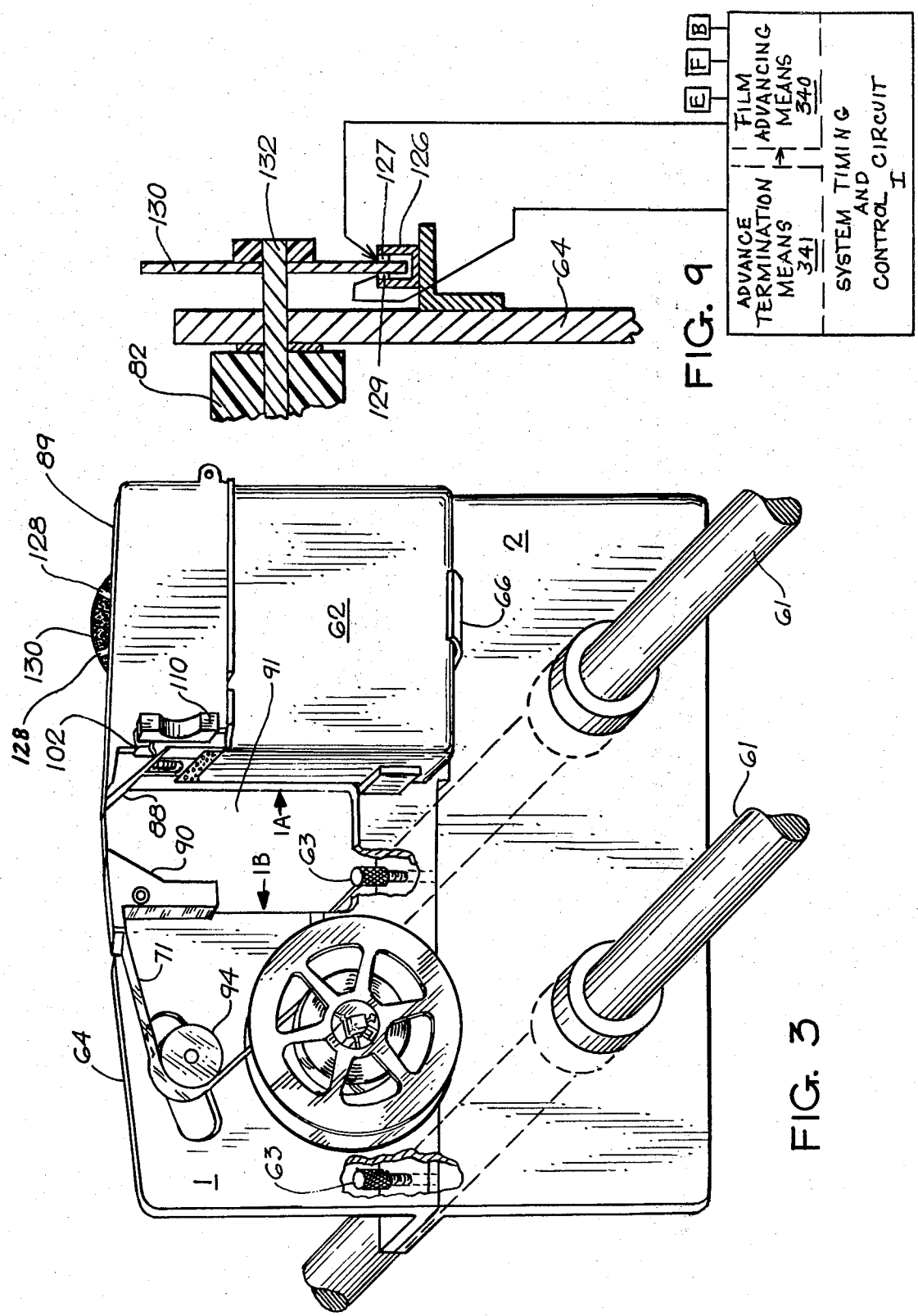

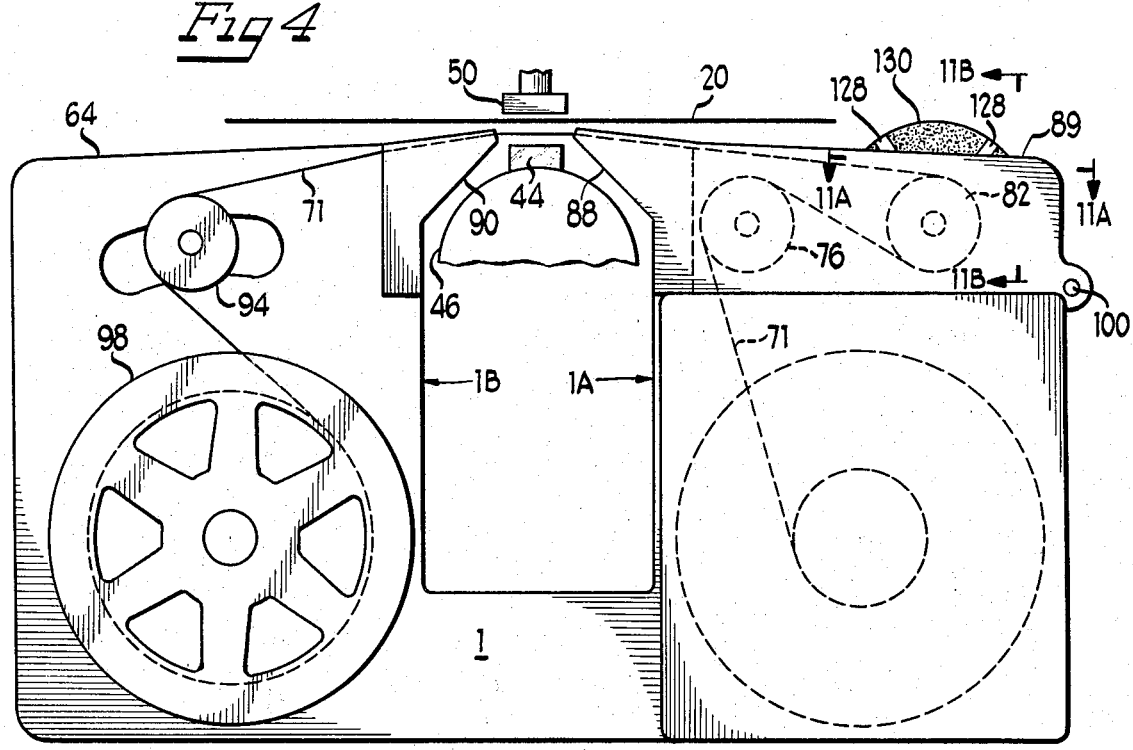
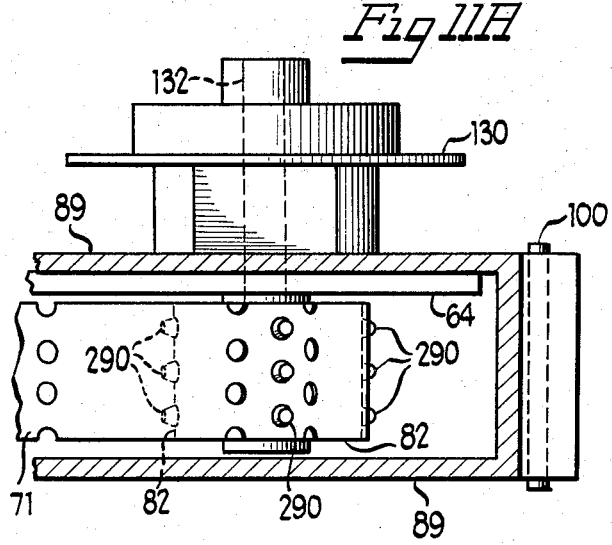
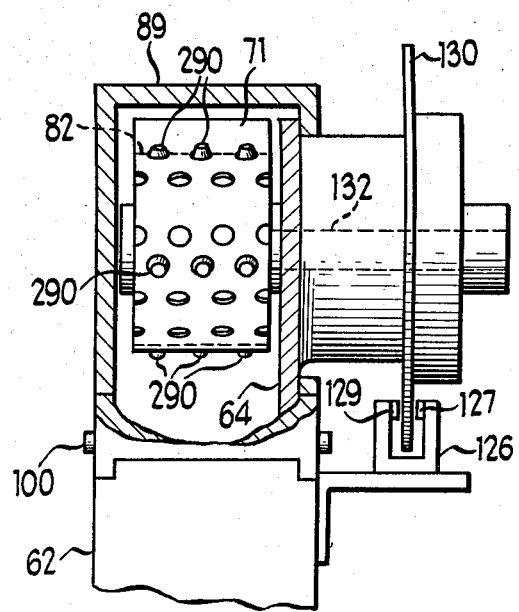

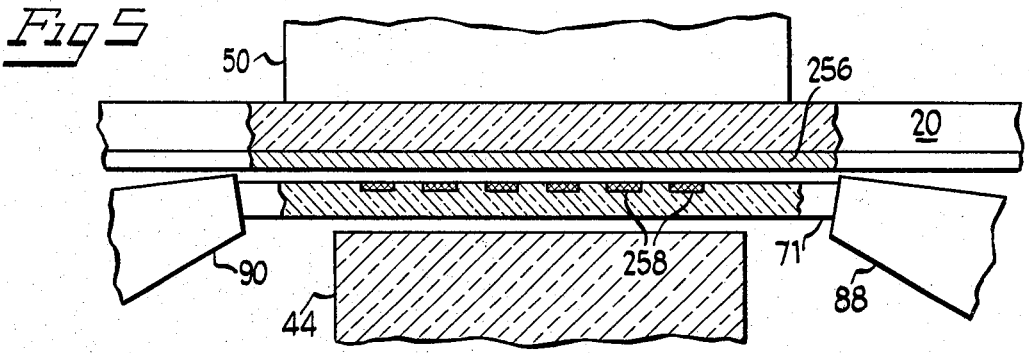
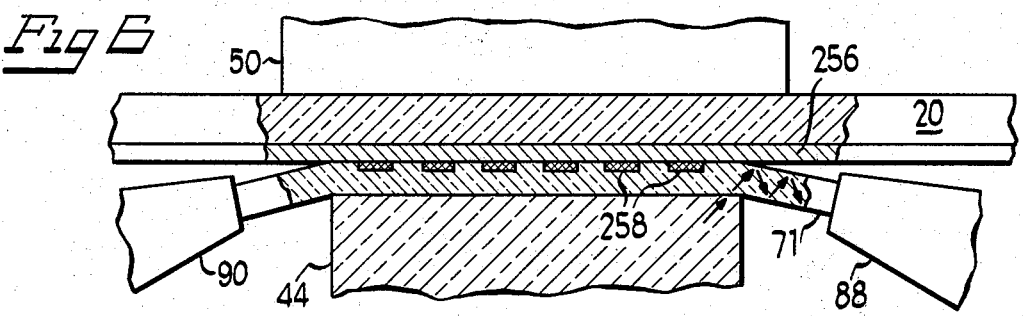
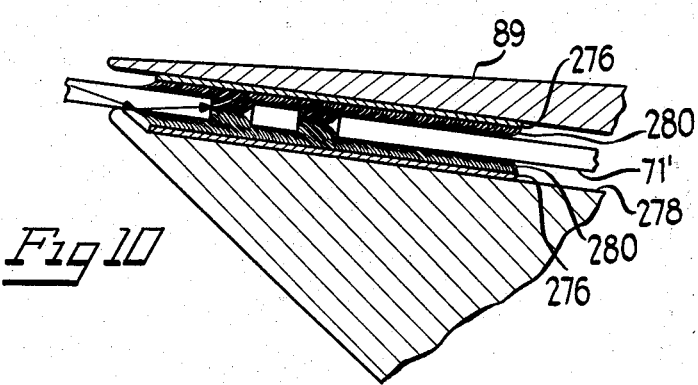
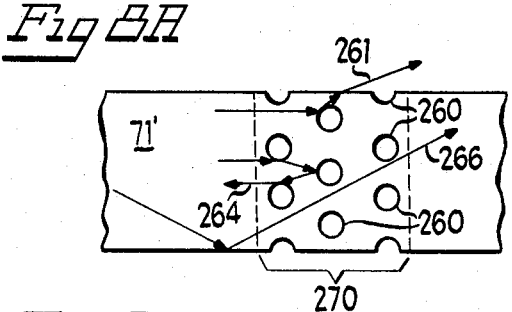
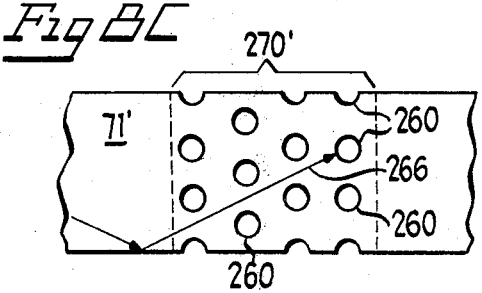
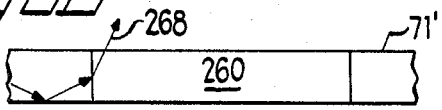
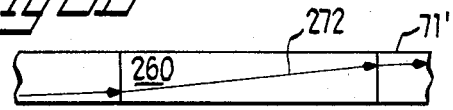

FILMSTRIP FOR PREVENTING FOGGING OF INTERMEDIATE FILM IN MICROFICHE RECORDING SYSTEMS

BACKGROUND OF THE INVENTION

The present invention relates to apparatus for preventing light fogging of unexposed photographic film in its dispenser, particularly as encountered in archival microfiche film systems employing an intermediate filmstrip to carry a transferable image.

There has been developed by Klose and Ovshinsky (U.S. Pat. No. 4,123,157 issued Oct. 31, 1978) an archival hard copy microfiche recording system which reflects light off of a document placed on a document-receiving platform and projects an image of it in greatly reduced form onto an initially transparent intermediate dry-silver filmstrip carried by a film head unit. The filmstrip is dispensed from a cassette mounted on the film head, and is fed by film advancing means to an imaging region where a selected area of the filmstrip to be exposed can receive the projected light image. A pressure element presses the selected area of the filmstrip against a planar backing aperture defining a projection plane and an imaging area, and the film is then exposed to the light image. The film head is next moved along guides from the imaging station to a developing station, where a hot shoe pressing against the exposed area of the film causes development of the image to form an opaque image in the exposed areas thereof. The film head is then moved to an image transfer station, where the image on the dry-silver film is to be replicated on a positive initially opaque microfiche film card of the photo-developing type (See U.S. Pat. No. 4,137,078 issued June 30, 1979 to Izu and Ovshinsky). The microfiche card is held indexed on a movable carriage so that a predesignated frame of the card receives the image on the intermediate film. A pressure element presses the film card and the intermediate filmstrip together between the output prism of a flash lamp housing and a backing plate. Image transfer is accomplished by triggering the flash lamp to direct light through the intermediate film, immediately rendering transparent the previously opaque areas struck by the high intensity flash lamp light on the selected frame of the microfiche film card. To replicate a new image the film head is returned to the imaging station, where the cycle is repeated.

The microfiche film cards are of the threshold photo-developing type, and require a relatively high radiant flux for complete exposure compared to the dry silver intermediate film used. The transfer of the intermediate image to the microfiche film is done by contact printing, using a high intensity flash lamp. A fraction of this illumination becomes trapped in the intermediate film, which is quite clear in unexposed regions, and proceeds to propagate laterally internally along the plane of the film by total internal reflection (light-piping), thereby making its way into unexposed film in the payout region of the film dispenser. A significant length of intermediate film thus becomes light struck in the film dispenser. This necessitates a long film advance between successive frames, and is thus wasteful of film.

This phenomenon is not significant during formation of the initial image because the requisite illumination level is much lower than for the transfer operation, owing to the relatively high speed of the intermediate film compared to the microfiche film. During the transfer operation the intermediate film is subjected to an illumination level several orders of magnitude higher than necessary for initial image formation, and the propagation of a small fraction of this by light-piping is sufficient to give rise to significant fogging effects. Additionally, the intermediate film is similarly fogged by prolonged exposure of the cassette to the ambient light of the system. It is an object of this invention to protect the microfiche record against the effects of fogging from both sources.

A conventional anti-fog approach such as the application of an overall light-absorbing layer (antihalation backing) on the film face opposite the photosensitve layer is inappropriate to dry-process films of the heat-developing kind. There is no obvious or practical way to remove such a layer to allow final image transfer. In conventional wet chemistry processing of photographic film the layer is dissolved away during the development process.

A pending application of Ovshinsky and Klose (Ser. No. 207,229, filed Nov. 17, 1980) discloses a variety of methods for producing transmission barriers in a dry-process intermediate filmstrip between the imaging area and the remainder of the unexposed film. These barriers take two basic forms. One is to produce reflection absorbing bands on the surface of the film, as by inking, or within the surface region of the film by local exposure and development of the photographic emulsion. Another version employs serration or other mechanical deformation of the film to destroy local film planarity and cause the trapped light to escape from the film or be reflected backwards.

Both approaches are successful, but require either additional special equipment in the microfiche system or special film manufacturing techniques not routinely employed by the photographic film industry. Accordingly, it is an object of this invention to provide adequate barriers in film by employing those techniques commonly used in the manufacture of photographic film.

SUMMARY OF THE INVENTION

As in the case of the barrier regions disclosed in the pending application of Ovshinsky and Klose (Ser. No. 207,229 filed Nov. 17, 1980), the barrier regions of the present invention are formed in the intermediate filmstrip between the filmstrip portion extended to receive the image of the record copy and the interior of the adjacent shielded film dispenser so as to hinder propagation of light or other film exposing energy from access to the active areas to the unexposed film supply by light-piping action in the filmstrip. (By active areas is meant those areas of unexposed film which must remain fog-free for subsequent imaging.) In the present invention, barrier regions consist of arrays of small holes in the film spanning its width. By a combination of multiple reflection scattering and direct escape of trapped light the undesired propagation is substantially suppressed. The holes are formed during film manufacture by a simple punching operation of the type used to create sprocket holes.

In accordance with a specific and preferred feature of the invention the barrier array is fabricated as a series of offset transverse rows or groups of holes so positioned that trapped light traveling lengthwise in the film cannot access an active region by direct barrier traversal between adjacent holes of one row without encountering one of the holes of an offset row.

In accordance with another feature of the invention further attenuation is secured by positioning pads bearing flexible bristle-like fibers over the array, as for example at the exit mouth of a microfiche recording system intermediate filmstrip dispenser where the filmstrip exits from a light tight environment to the imaging position of the system. Local entry of the fibers into the holes comprising the array serves to interrupt that portion of the trapped radiation that might otherwise traverse the holes to re-enter the filmstrip.

Flexible bristle light sealing barriers are long known in the art, and are in fact the principal light sealing means in the dispensing passage of conventional 35 millimeter film cassettes. In such cases, however, such seals act to prevent passage of light around the film rather than through it. Fiber penetration occurs in the sprocket holes at the side margins of the film. Such holes are not located in the path of light directed longitudinally toward the active areas of the film. In such cases penetration of sprocket holes by fibers is merely incidental and is not done with the intention of preventing the passage of light across sprocket holes to such active areas, as in the case of the present invention. The use of bristle engagement of an array of transmission-spoiling holes spanning the film to protect the active central area is thus a hitherto unrecognized function.

In accordance with another feature of the invention at least one of the barrier holes engages a suitably designed indexing sprocket to facilitate film transport.

The barrier hole arrays may be inexpensively fabricated by means well known in the art, and effects a significant economy of expensive silver-based intermediate film by obviating the necessity for long film payout between successive frames in order to present unfogged active areas of intermediate film for subsequent imaging.

Other objects, features, and advantages of the invention will become apparent upon making reference to the specification to follow, the drawings, and the claims.

DESCRIPTION OF DRAWINGS

FIG. 1 is a block diagram of the control circuitry of the microfiche recording system;

FIG. 2 is a perspective view of a traveling film head including an intermediate film dispensing cassette positioned at an imaging station with a film head cover in the open position to show details of a film dispensing system;

FIG. 3 is a perspective view of the traveling film head and a carriage therefor movably mounted on guides;

FIG. 4 is a front elevation of the film head, showing its position in relation to a microfiche film card, a flash housing, and a backing element when positioned at a transfer station;

FIG. 5 is an expanded front elevation of the imaging area of FIG. 4 in the immediate vicinity of the flash housing and backing element, with the microfiche film card and the intermediate filmstrip, shown partially sectioned;

FIG. 6 shows the same region with the flash housing, intermediate film, microfiche film card, and backing element in pressure contact for image transfer, and shows the light-piping propagation of light from the flash unit into the dispensing region;

FIG. 8A is a plan view of a barrier array of holes in the filmstrip, showing attenuation mechanisms for trapped light via reflection return and edge loss, as well as a possible corridor propagation for edge reflected rays.

FIG. 8B is a cross section elevational view of the region around one barrier hole in the filmstrip of FIG. 8A showing attenuation by facial leakage.

FIG. 8C is a plan view of an improved barrier array wherein the corridors in the array of FIG. 8A are substantially blocked.

FIG. 8D is a cross section elevational view of the region around one barrier hole in the filmstrip of FIG. 8A showing possible barrier penetration by traversal of a hole.

FIG. 9 is a cross sectional elevation of a film movement sensor and encoder wheel assembly, along with a block diagram of the associated control circuitry;

FIG. 10 is a cross section view of the payout lip region of the film head showing details of a pair of fiber pads employed to fill the barrier holes with fibers and block the propagation mode shown in FIG. 8D.

FIGS. 11A and 11B are a partially sectioned top plan view and a partially sectioned side elevation respectively of a modified encoder roller assembly for film advance indexing.

DESCRIPTION OF EXEMPLARY FORM OF THE INVENTION

Figure 7A:
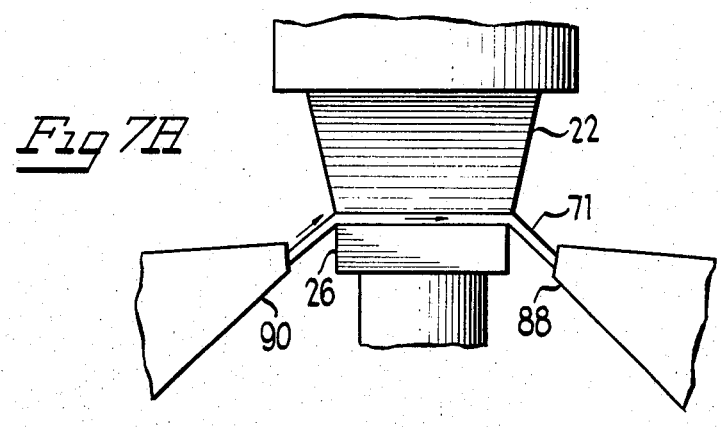
FIGS. 7A-7C are elevational views of the imaging region between the payout and takeup lips of the intermediate film head of FIG. 2 at the imaging, developing, and transfer stations.

FIG. 1 includes a block diagram of the control system for sequencing the operation and movement of an intermediate film head 1 and head carriage 2 between various stations of a microfiche recording system. The head carriage is advanced to the various stations illustrated in FIG. 1 by tension in a belt 3 extending between an idler pulley 4 and a motor driven pulley 5. A pulley drive motor 6 is controllably driven in both directions by a system timing and control circuit 7 operating through a motor control circuit 8. The stations illustrated are an imaging station 10, where the exposed area of the initially transparent intermediate filmstrip on the film head 1 is exposed to a light image, such as light reflected off of a hard copy, a heat-applying developing station 12 where the light-exposed areas of the intermediate film are rendered opaque, and an image transfer station 14. A microfiche film card carriage 16 at the image transfer station 14 positions, under control of a fiche carriage position control means 18, a selected frame of a microfiche film card 20 for reception of an image last formed on the filmstrip carried by the film head 1. The microfiche film card 20 is preferably made from a photo-developing initially opaque archival film of the dispersal type disclosed in U.S. Pat. No. 4,137,078 issued to Izu and Ovshinsky, wherein a transferred image is formed upon exposure to a high intensity flash of radiant energy, such film being completely insensitive to exposure to normal room ambient light or even direct sunlight. The film carried by the film head is preferably more light sensitive and is latently imaged by the relatively less intense light reflected and imaged from hard copy. The intermediate film carried by the film head is preferably a dry-silver heat-developed film. Throughout this text the term film is used to denote a substrate carrying a photosensitive layer.

As used herein, the term film head refers to a frame removably attached to a carriage, and a film supply unit removably mountable on the frame. The film head 1 carries a film supply means E, a film takeup means F, and a film clamping of holding means B. In various versions of such a system all three are sequentially controlled by the system timing and control circuit 7. For example, the supply means E may include a supply reel or cassette, and various guide rollers as well as film driving means where the supply reel is to be driven. The takeup means F may include a takeup reel and guide roller means as well as film tensioning means and takeup reel drive means. In addition, the film head may include an end-of-film sensor D which may respond to a marking on the film. The film head may also include a tension sensor G responsive to tension in the film. The end-of-film sensor D and tension sensor G perform control functions which respond to end-of-film or film breakage and disable operation of the system under these circumstances. A film break warning means 25 and an end-of-film warning means 25' serve to warn the operator of such situations. The film head 1 may also include a film head interlock switch C which communicates the status of a light sealed film dispenser cover to the system timing and control circuit 7, so that the system cannot be operated with the cover open and the film inside thus subject to light fogging.

Initially, the film head 1 is moved to the imaging station 10, where an imaging area of the filmstrip is placed under a projection lens 21 contained in a lens shroud 22 (see FIG. 7A). The film clamping means B is actuated to a film release condition and an area of fresh intermediate filmstrip is advanced into the imaging area by driving the supply or takeup means E or F. Payout length is governed by the film movement sensing means A, which effects generation of electrical signals measuring the length of film payout to the system timing and control circuit 7. In one version of such a system the film movement sensing means A outputs a control pulse after the proper amount of film payout to terminate film advance, whereupon the system timing and control circuit 7 stops driving of the film supply or takeup means E or F and actuates the clamping or holding means B back to a film holding condition, whereupon a signal from the system timing and control circuit 7 raises a backing pad 26 up against a pad limit stop 23. A subsequent command from the system timing and control circuit 7 actuates a lens shroud moving means 21' to lower the lens shroud 22 to clamp the intermediate film between the backing pad 26 and the base of the lens shroud 22. A document receiving platform 28 is next illuminated by flash lamps 30 and 32 energized by the exposure pulser 34 on command from the system timing and control circuit 7, the image of the platform and its contents being relayed to the projection lens 21 by two mirrors 36 and 38. On command, the pad lifting solenoid 24 drops the pressure pad 26, and the lens shroud moving means 21' lifts the lens shroud 22, thereby releasing the film. The film head 1 is now moved to a developing station 12, where a shoe lifting solenoid 40 controlled by the system timing and control circuit 7 raises a hot shoe 42 (see FIG. 7B) against the imaging area 9 (see FIG. 2) of the filmstrip 71 for a predetermined length of time set by the system timing and control circuit 7, whereupon the shoe lifting solenoid 40 drops the hot shoe. The film head 1 is then moved to a position which places the imaging area 9 of the filmstrip over a flash prism 44 on a flash housing 46. A selected frame of a microfiche film card 20 on a microfiche card carriage 16 is moved into appropriate position over the flash housing 46 with the system timing and control circuit 7 controlling the microfiche carriage position control means 18. The desired frame of the microfiche film card 20 is selected by operation of keys of a keyboard 17 which cause the control circuit 7 to operate the microfiche carriage position control means 18. On command of the system timing and control circuit 7, a flash lifting solenoid 48 raises the flash housing 46 against a limit stop 49. A backing element 50 is lowered by the backing element moving means 51 so as to press the imaging area of the intermediate filmstrip into intimate contact with the microfiche film card 20 and a backing element 50 (see FIG. 7C). Image transfer is achieved by triggering the flash tube (not shown) in the flash housing 46 by a command from the system timing and control circuit 7 operating through a flash pulser circuit 52. Immediately after exposure, the lifting solenoid 48 drops the flash housing 46, and the backing element moving means 51 raises the element 50, thereby releasing the two films.

The pad lifting solenoid 24 and a projection light source 11 are mounted on an image station carriage 13. A station carriage position control means 15 is commanded by the system timing and control circuit to position either the pad lifting solenoid 24 or the projection light source 11 under the lens 21. For reading or updating a microfiche the fiche card carriage 16 is moved by the fiche carriage position control means 18 to a position under the lens 21, and the projection light source 11 is moved into position below it so as to project the image on the microfiche back onto the document receiving platform 28 for inspection and, where an add-on of information is to be made on the frame of the microfiche card involved, an overlay of the added information can be properly positioned over the projection image. The recording system carries out the desired recording and microfiche frame positioning operations as commanded by the operator by depressing the appropriate keys on a keyboard 17 connected to the system timing and control circuit 7. The system timing and control circuit is powered by a power supply 55 connected to the power line by a main power switch 53 and a system interlock switch 57.

Refer now to FIGS. 2 and 3 which show the details of an exemplary film head 1. FIG. 3 shows the traveling film head 1 removably mounted as by screws 63 on the carriage 2 guided for horizontal movement on guide rods 61. FIG. 2 shows the film head positioned at the imaging station 10. The backing pad 26, the hot shoe 42, the flash prism 44, and the projection light source 11 are also shown. The film head is shown as including a film supply section 1A including a removably film dispensing cassette 62 mounted on a film head frame 64 and held in position by a cassette support ledge 66. The intermediate filmstrip 71 exits the cassette through a slot 74 in a top ledge 70, passing next around an idler roller 76 where it presses against a compliant friction pad 78 which places a drag force on the film, and thence through an end-of-film sensor unit 80. The filmstrip 71 then passes around an encoder roller 82 and back over a film clamp lifter 84, then over a clamping block 86 where it then exits the film supply section between a payout lip pad 88' and a pad (not shown) mounted on a film head cover 89 and over a payout lip 88, where one frame width of the filmstrip is exposed for external processing at what may be called an imaging area of the film head.

In this embodiment the film holding or clamping function is achieved by a short clamp blade (not shown) mounted inside the cover 89. When the cover 89 is closed, the blade presses down on the film strip 71 to pin it to the clamping block 86. The cover 89 is tensioned down by a loading spring (not shown). Clamping release is achieved by a solenoid (not shown) drawing down the exterior end of a pivoted lift bar 114, thus raising the interior end of the lift bar carrying the film clamp lifter 84 so as to force the lifter into contact with the interior face of the cover 89 against the force of the loading spring. This raises the cover 89 sufficiently to raise the clamp blade out of its film engaging position, thereby releasing the filmstrip 71.

The frame 64 has a large open region 91 between the film supply section 1A and the film takeup section 1B of the film head. This open region receives the backing pad 26, hot shoe 42 and flash housing 46 at the imaging, developing and image transfer stations 10, 12 and 14. The film then passes over a takeup lip 90 on the takeup side of the imaging area and then proceeds over a dancing roller 94 carried on an arm 95 tensioned by a spring 93 which forces the roller away from the takeup lip 90, and serves to keep the film under tension. The film then winds on a motor driven takeup reel 98 driven by a takeup motor (not shown) mounted on the frame 64. The takeup reel 98 is mounted on a drive shaft 98′ which makes connection to the motor in any suitable way, such as by a pulley belt coupling so that the entire film head 1 can be removed from the carriage 2, as by removing the screws 63—63 and raising the film head therefrom, where the film can be threaded through the film head conveniently away from the carriage.

FIG. 9 shows details of an intermediate film feed control means incorporated into the film head 1. Actuation of a film advancing means 340 in the system timing and control circuit 7 causes the intermediate film to advance under tension over the encoder roller 82 as previously described, causing the encoder roller to rotate. The advancing means 340 controls the sequencing of the supply means E, the takeup means F, and the clamping means B in FIG. 1. The rotation of the encoder roller 82 is detected by a light sensing unit 126 mounted on the frame 64, and which monitors the passage of clear transparent lines 128 on an otherwise opaque encoder wheel 130 attached to the outboard end of the encoder roller shaft 132, the wheel, shaft, and roller being rigidly interconnected. The passage of a clear line 128 allows passage of a light beam from a light source 127 to a photodetector 129. The light pulse detected by the light sensing unit is transmitted to an advance termination means 341 in the system timing and control circuit 7, which actuates the film advancing means 340 to terminate power to the film advance motor (not shown, and symbolically represented by F), which drives the takeup reel 98.

Figure 7B:
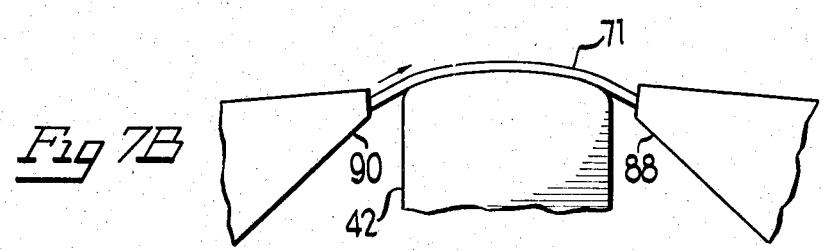
Figure 7C:
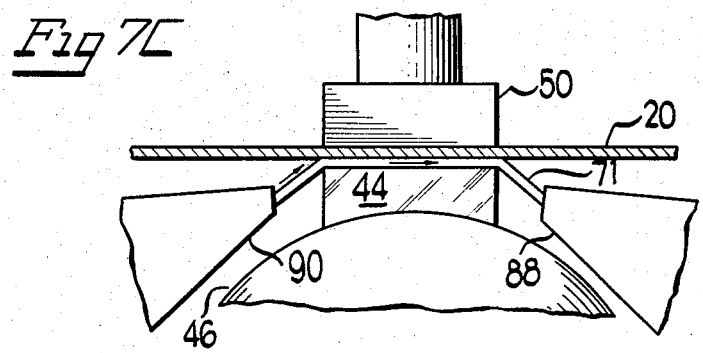

FIG. 4 is a front elevation of the film head 1, showing its position in relation to the microfiche film card 20, the flash housing 46, and the backing element 50 when positioned at the transfer station 14 of FIG. 1. FIGS. 7A through 7C show partial plan views of the film head 1 in the region of the imaging area of the film head during image exposure (FIG. 7A), development (FIG. 7B), and image transfer (FIG. 7C). Since the intermediate film 71 is rigidly clamped internally on the payout side, the film is fixed in position at the payout lip 88. However, the compliant tensioning of the film by the spring loaded dancing roller 94 on the takeup side permits a slight film payout to take place from the takeup side as shown by arrows in FIGS. 7A, 7B, and 7C when the backing pad 26, hot shoe 42 and flash housing 46 are raised into position. This prevents breakage of the intermediate film 71 under the forces involved.

Film fogging occurs by light-piping action during the transfer operation. FIG. 5 shows a partially sectioned view of the imaging region between the payout lip 88 and the takeup lip 90 with the microfiche film card 20 in place below the backing element 50. The flash prism 44 is located immediately below the intermediate filmstrip 71. FIG. 6 shows the same region during image transfer, with the flash prism 44 pressing the assembly into contact. The emulsion layer of the filmstrip 71 is in proximate contact with the photodeveloping imaging layer 256 of the microfiche film card 20. Light from the flash prism 44 passes through the record indicia 258 to replicate them in the imaging layer. A fraction of this light is trapped in the clear areas of unexposed intermediate film, and proceeds by total internal reflection into the unexposed film as indicated by the arrows.

In the exemplary form of the invention barrier regions are created in the intermediate film 71 so as to interpose between the flash prism 44 and the cassette interior a means for significantly reducing this light-piping transmission. Each such barrier consists of an array 270 of holes 260 piercing the filmstrip 71′ as shown in FIG. 8A. Propagating trapped light must undergo a series of substantially randomizing reflections and refractions at the hole walls. Light loss occurs by a variety of mechanisms, i.e. side leakage (ray 261, FIG. 8A), general reversal (ray 264, FIG. 8A), and facial leakage ray 268, FIG. 8B). The exemplary form of the array 270 consists of offset rows of holes 260 positioned such that no trapped ray may traverse the barrier array 270 parallel to the film edges without encountering at least one hole. Other forms of arrays of holes of various sizes and distribution may equally be well employed, and may be designed such that no propagating ray may penetrate the barrier unobstructed at any angle. Thus, FIG. 8C shows an improved barrier array 270′, wherein simply by replicating the rightmost row of the barrier array 260 in FIG. 8A, the diagonal corridors of FIG. 8A are substantially blocked, thus obstructing the propagation of a possible edge-reflected ray 266 in FIGS. 8A and 8C. Such barrier holes need not be circular, but may take a variety of forms, e.g. square, rectangular, etc.

To secure an additional attentuation of those rays that successfully traverse a hole, as shown by ray 272 in FIG. 8D, provision is made to press velour pads into contact with the barrier array so that the bristle-like fibers of the velour interpenetrate the holes of the barrier array 260 to intercept such rays. FIG. 10 is an expanded fragmentary view of the region of the payout lip 88 of FIG. 6, showing interior details. The filmstrip 71′ is supported and pressed between two velour pads 276, one mounted on the interior surface 278 of the payout lip 88, the other mounted on the inside of the cover 89. The fibers 280 of the velour pads 276 penetrate the holes to a significant degree. The thickness of the filmstrip 71′ is exaggerated in FIG. 10 to show details of the engagement. Typical filmstrip thickness for the dry-silver film used in such a microfiche recording system is of the order of 0.2 millimeters. Since the fiber length of the velour is significantly in excess of this, the holes of the array 270 are well filled by the fibers.

By the foregoing means an array of barrier holes interpenetrated by fibers is interposed so as to block propagation of trapped light into the unexposed film regions. This system has proven to be successful in reducing light-pipe transmission markedly and to an acceptable degree, and has resulted in a significant economy of film.

The process of fabricating holes in photographic film during manufacture is long known in the art, principally for use with sprocket drive systems. Thus a known technique suited to large volume production of photographic film has been adapted to produce an anti-fog barrier. This accomplishes the object of the invention.

Such an array of holes also lends itself to indexing the filmstrip 71' during the film advance operation to insure proper barrier positioning after film advance. Thus, referring to FIGS. 11A and 11B showing a modified encoder roller 82' to be used in the film head of FIG. 2, let the roller have a circumference equal to the length of filmstrip representing four film advances. Four groups of three sprocket teeth 290 are spaced around the circumference and engage the filmstrip 71', thereby rigidly indexing the encoder roller 82' and the encoder wheel 130 to the barrier positions. The transparent lines 280 (FIG. 4) on the encoder wheel 130 are in this case four in number and equally spaced. By proper orientation of the encoder wheel 130 with respect to the encoder roller 82' the photosensor 129 of FIG. 11B will activate the film advance termination means 341 (See FIG. 9) to terminate film advance with a barrier array properly positioned as shown in FIG. 10. Such an engagement may also be used to facilitate film payout, tensioning, or takeup in conventional fashion in alternative versions of the film transport system.

While for the purpose of illustration, various forms of this invention have been disclosed, other forms thereof may become apparent to those skilled in the art upon reference to this disclosure and, therefore, this invention shall be limited only by the scope of the appended claims.

I claim:

1. An improved photographic filmstrip for inhibiting fogging of unexposed areas by interfacial light piping, said filmstrip comprising:
    a filmstrip body having a photoactive layer to be imaged; and
    a plurality of propagation barrier means on or in said film body, each of said barrier means being disposed extending in a transverse direction across said filmstrip body to intercept light propagating by internal reflection through said film body towards unimaged areas of said filmstrip, said barrier means being separated from each other along a portion of the length of said filmstrip body and disposed intermediate to longitudinally spaced imaging areas on said filmstrip body, each said barrier region comprising aperture means extending through said filmstrip and disposed across substantially the entire active width of said strip to form a barrier to said propagation by the walls of said aperture means acting as escape points and partially reflecting elements.

2. The filmstrip of claim 1 wherein said aperture means comprises an array of holes disposed transversely across said filmstrip and having a size, number, and arrangement such that substantially all imaging light within said active width propagating longitudinally lengthwise along said filmstrip by said internal reflection will encounter at least one hole.

3. The filmstrip of claim 2 wherein each said array of holes is arranged in a plurality of offset groups of holes, each said group being disposed substantially laterally transverse to the lengthwise direction of said filmstrip, the holes in each group being disposed transversely offset with respect to the holes of at least one other group of the same array.

4. The filmstrip of claim 3 wherein each said group is a row of holes extending transversely across said filmstrip, each said array comprising at least two such rows with the holes of one row transversely offset with respect to the holes of another row.

5. In a microfiche film recording system including intermediate filmstrip which is initially transparent and provides an image when imaged by imaging energy and is contained in an imaging energy sealed support means, means for selectively advancing a limited area of the sealed filmstrip to be imaged to an imaging energy supplying region while the adjacent still unimaged areas remain in said sealed portion of said film support means, carriage means for moving said film support between image-producing station means where the exposed area of said filmstrip is imaged by said imaging energy and an image transfer station where the imaged area is to be transferred by projecting an imaging energy source therethrough to a microfiche photographic film having frames upon which said image is to be transferred, means for controllably positioning said microfiche photographic film at said image transfer station with respect to the last imaged area of the intermediate filmstrip, and means at said image transfer station for transferring said image to a selected frame of said microfiche film by exposure to said imaging energy source which can fog the adjacent sealed unimaged portion of film by internal reflection, said filmstrip having between each such limited area of the filmstrip and the adjacent later to be exposed area thereof an imaging energy propagation barrier region having the property of inhibiting the propagation of said energy into said sealed portion of said film support means by internal reflection between the opposite surfaces of the filmstrip, the improvement wherein each said barrier region comprises aperture means extending through said filmstrip and disposed across substantially the entire active width of said strip to form a barrier to said propagation be the walls of said aperture means acting as escape points and partially reflecting elements.

6. The microfiche film recording system of claim 5 wherein said aperture means comprises an array of holes disposed transversely across said filmstrip and having a size, number, and arrangement such that substantially all imaging light within said active width propagating longitudinally lengthwise along said filmstrip by said internal reflection will encounter at least one hole.

7. The microfiche film recording system of claim 5 wherein each said array is arranged in a plurality of offset groups of holes, each said group being disposed substantially laterally transverse to the lengthwise direction of said filmstrip, the holes in each group being disposed transversely offset with respect to the holes of at least one other group of the same array.

8. The microfiche film recording system of claim 8 wherein each said group is a row of holes extending transversely across said filmstrip, each said array comprising at least two such rows with the holes of one row transversely offset with respect to the holes of another row.

9. In a film processing system including a filmstrip which is initially transparent and provides an image when imaged by imaging energy and is contained in an image energy sealed portion of a film support means, means for selectively advancing a limited area of the sealed filmstrip to an imaging energy supplying region while the adjacent still unimaged areas remain in said sealed portion of said film support means and means for directing a source of imaging energy through said limited area of said filmstrip which can fog the adjacent unimaged portions of the film by internal reflection therein, said filmstrip having between each such limited area of the filmstrip and the adjacent later to be exposed area thereof an imaging energy propagation barrier region having the property of inhibiting the propagation of said energy into said sealed portion of said film support means by internal reflection between the opposite surfaces of the filmstrip, the improvement wherein each said barrier region comprises aperture means extending through said filmstrip and disposed across substantially the entire active width of said strip to form a barrier to said propagation by the walls of said aperture means acting as escape points and partially reflecting elements.

10. The film processing system of claim 9 wherein said aperture means comprises an array of holes disposed transversely across said filmstrip and having a size, number, and arrangement such that substantially all imaging light within said active width propagating longitudinally lengthwise along said filmstrip by said internal reflection will encounter at least one hole.

11. The film processing system of claim 10 wherein each said array is arranged as a plurality of offset groups of holes, each said group being disposed substantially laterally transverse to the lengthwise direction of said filmstrip, the holes in each group being disposed transversely offset with respect to the holes of at least one other group of the same array.

12. The film processing system of claim 11 wherein each said group is a row of holes extending transversely across said filmstrip, each said array comprising at least two such rows with the holes of one row transversely offset with respect to the holes of another row.

13. The microfiche system of claim 5 or 9 wherein said advancing means comprises film engaging means configured to engage at least a portion of said aperture means.

14. The system of claim 6, 7, 8, 10, 11, or 12 wherein said advancing means comprises a sprocket wheel configured to engage at least one hole in each said array.

15. The system of claims 5 or 9 further comprising removable light absorbing means entering at least a portion of said aperture means to prevent said illumination propagating by internal reflection from exiting at a point on the wall of said aperture means and thereafter re-entering said filmstrip.

16. The system of claims 5 or 9 further comprising removable light absorbing means entering at least a portion of said aperture means to permit said illumination propagating by internal reflection from exiting at a point on the wall of said aperture means and thereafter re-entering said filmstrip, said light absorbing means comprising outwardly extending fibers of a fiber-bearing element pressed into contact with said filmstrip over said aperture means.

17. The system of claims 6, 7, 8, 10, 11, or 12 further comprising removable light absorbing means entering at least one of said holes to prevent said illumination propagating by internal reflection from exiting at a point on the wall of said at least one hole and thereafter re-entering said filmstrip.

18. The system of claims 6, 7, 8, 10, 11, or 12 further comprising removable light absorbing means entering at least one of said holes to prevent said illumination propagating by internal reflection from exiting at a point on the wall of said at least one hole and thereafter re-entering said filmstrip, said light absorbing means comprising outwardly extending fibers of a fiber-bearing element pressed into contact with said filmstrip over said at least one hole.

* * * * *

UNITED STATES PATENT AND TRADEMARK OFFICE
CERTIFICATE OF CORRECTION

PATENT NO. : 4,402,597

DATED : September 6, 1983

INVENTOR(S) : Mark H. McCormick-Goodhart

It is certified that error appears in the above-identified patent and that said Letters Patent is hereby corrected as shown below:

Column 3, line 33, delete "in" and insert --to--;

Column 3, line 33, delete "effects" and insert --effect--; and

Signed and Sealed this

Twenty-first Day of August 1984

[SEAL]

Attest:

GERALD J. MOSSINGHOFF

Attesting Officer   Commissioner of Patents and Trademarks